United States Patent
Yonehana et al.

(10) Patent No.: US 8,360,188 B2
(45) Date of Patent: Jan. 29, 2013

(54) ELECTRIC MOTORCYCLE

(75) Inventors: Atsushi Yonehana, Saitama (JP); Hiroyuki Kikuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 628 days.

(21) Appl. No.: 12/567,165

(22) Filed: Sep. 25, 2009

(65) Prior Publication Data

US 2010/0078237 A1  Apr. 1, 2010

(30) Foreign Application Priority Data

Sep. 30, 2008 (JP) .................................. 2008-255308

(51) Int. Cl.
*B62M 7/00* (2010.01)
*B60K 1/00* (2006.01)

(52) U.S. Cl. ...................... 180/220; 180/227; 180/65.51

(58) Field of Classification Search ................... 180/220, 180/223, 230, 55, 56, 59–62, 291, 292, 297, 180/65.1, 65.51, 65.6, 312
See application file for complete search history.

(56) References Cited

U.S. PATENT DOCUMENTS

| 5,421,427 | A | * | 6/1995 | Ogawa et al. | 180/220 |
|---|---|---|---|---|---|
| 5,524,726 | A | * | 6/1996 | Wright, Jr. | 180/220 |
| 5,577,747 | A | * | 11/1996 | Ogawa et al. | 180/220 |
| 6,109,383 | A | * | 8/2000 | Matsuto et al. | 180/220 |
| 6,321,863 | B1 | | 11/2001 | Vanjani | |
| 6,460,642 | B1 | | 10/2002 | Hirano | |
| 7,866,431 | B2 | * | 1/2011 | Ito | 180/219 |
| 2003/0111283 | A1 | * | 6/2003 | Hakamata et al. | 180/219 |
| 2004/0238242 | A1 | * | 12/2004 | Honda et al. | 180/65.1 |
| 2004/0238253 | A1 | * | 12/2004 | Yonehana et al. | 180/219 |
| 2005/0121245 | A1 | * | 6/2005 | Tsukada et al. | 180/230 |
| 2005/0254933 | A1 | * | 11/2005 | Deschamps et al. | 414/680 |

FOREIGN PATENT DOCUMENTS

| EP | 1405785 A2 | 4/2004 |
|---|---|---|
| EP | 1750357 A1 | 2/2007 |
| JP | 3317560 B2 | 6/2002 |

* cited by examiner

*Primary Examiner* — J. Allen Shriver, II
*Assistant Examiner* — Bridget Avery
(74) *Attorney, Agent, or Firm* — Birch, Stewart, Kolasch & Birch, LLP

(57) ABSTRACT

An electric motorcycle is provided such that even if a power drive unit is mounted to a swing arm, it is difficult for a load to be applied to wiring connected to the power drive unit. In an electric motorcycle in which a PDU and a running-purpose power-generating motor are attached to a swing arm turning around a pivot shaft, and electricity from batteries is supplied via a contactor box to the PDU, from which the electricity is supplied to a power-generating motor, torsional portions extending generally parallel to the pivot shaft are provided at a portion of output lines connecting the contactor box with the PDU so as to allow torsion to absorb swinging movement of the swing arm.

20 Claims, 7 Drawing Sheets

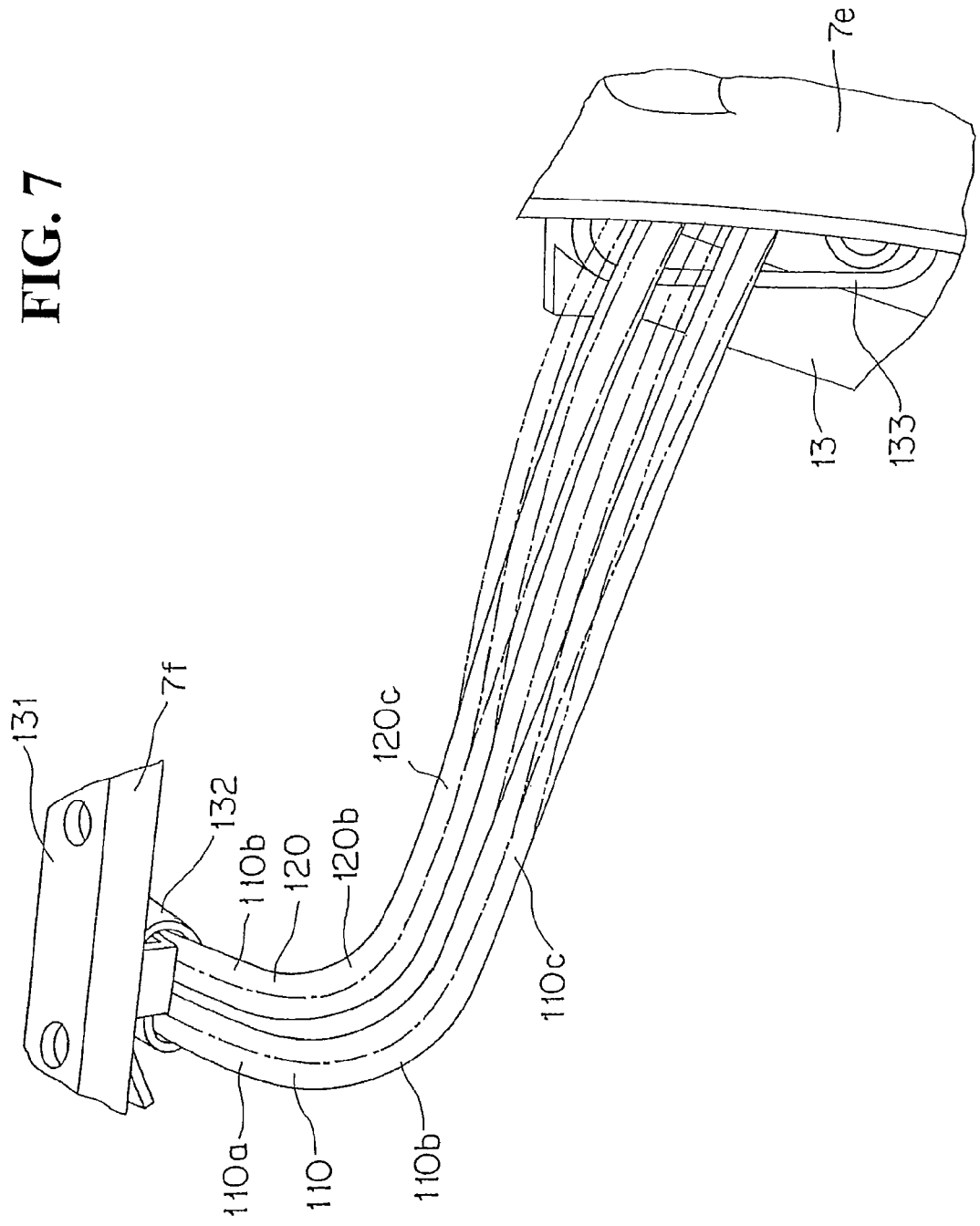

ELECTRIC MOTORCYCLE

CROSS-REFERENCE TO RELATED APPLICATIONS

This application claims priority under 35 U.S.C. §119(a) to Application No. 2008-255308, filed in Japan on Sep. 30, 2008, the entirety of which is expressly incorporated herein by reference.

BACKGROUND OF THE INVENTION

1. Field of the Invention

The present invention relates to an electric motorcycle that supplies electricity from a battery mounted to a vehicle body to a running-purpose power-generating motor.

2. Description of Background Art

There in known an electric motorcycle in which a battery is mounted, wherein electricity supplied from the battery drives a running-purpose power-generating motor. (See, e.g. Japanese Patent No. 3317560)

In addition, the electricity supplied from the battery is supplied to the power-generating motor via a power drive unit incorporating a drive circuit, etc.

In such an electric motorcycle, the power drive unit is attached to a swing arm. In such a case, the power drive unit is vertically moved together with the swing arm vertically swinging around a pivot shaft. Therefore, wiring connecting the battery with the power drive unit is pulled along with the movement of the swing arm. It is therefore necessary sometimes to deal with the load of the wiring.

SUMMARY OF THE INVENTION

The present invention has been made in view of the above-mentioned situations and aims to provide an electric motorcycle in which even if a power drive unit is mounted to a swing arm, it is difficult for a load to be applied to wiring connected to the power drive unit.

To solve the above-mentioned problem, in the present invention, an electric motorcycle in which a power drive unit and a running-purpose power-generating motor are attached to a swing arm turning around a pivot shaft and electricity from a battery is supplied via a contactor box to the power drive unit, from which the electricity is supplied to a power-generating motor, a torsional portion extending generally parallel to the pivot shaft is provided at a portion of an output line connecting the contactor box with the power drive unit so as to allow torsion to absorb swinging movement of the swing arm.

According to this configuration, the turning of the swing arm can be absorbed by the torsion of the lines.

A wiring support member is provided close to the swing arm to permit the output line to shift in back and forth, and up and down directions of a vehicle body, but to restrain the output line from shifting in a width direction of the vehicle body.

According to this configuration, even if force is applied to the line, the line shifts in the back and forth, and up and down directions of the vehicle body to make it difficult for a pulling force to be applied to the line.

Further, the torsional portion may come into a torsional state when the vehicle is unloaded but the torsional portion may be released from the torsional state when the vehicle is loaded.

According to this configuration, when the vehicle body sags during operation, it is possible for the line not to cause a load in a torsional direction.

According to the present invention, in the electric motorcycle in which the power drive unit and the running-purpose power-generating motor are attached to the swing arm turning around the pivot shaft and electricity from the battery is supplied via the contactor box to the power drive unit, from which the electricity is supplied to the power-generating motor, the torsional portion extending generally parallel to the pivot shaft is provided at a portion of the output line connecting the contactor box with the power drive unit so as to allow torsion to absorb swinging movement of the swing arm. Thus, the turning of the swing arm can be absorbed by the torsion of the lines, which makes it difficult for a pulling force to be applied to the line, thereby making it difficult for the line to cause a load.

In addition, the wiring support member is provided close to the swing arm to permit the output line to shift in the back and forth, and up and down directions of the vehicle body but to restrain the output line from shifting in the width direction of the vehicle body. Therefore, even if force resulting from the shift of the swing arm is applied to the line, the line shifts in the back and forth, and up and down directions of the vehicle body to make it difficult for a pulling force to be applied to the line. In addition, since the line is restrained from shifting in the width direction, it is possible to prevent the wiring route from coming close to the sliding portion between the pivot shaft and the swing arm.

Further, the torsional portion comes into a torsional state when the vehicle is unloaded but is released from the torsional state when the vehicle is loaded. Therefore, when the vehicle body sags during operation, it is possible for the line not to cause a load in a torsional direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a schematic diagram illustrating the relationship between the displacement of a swing arm and the torsion of output lines.

DETAILED DESCRIPTION OF THE PREFERRED EMBODIMENTS

Figure 1:
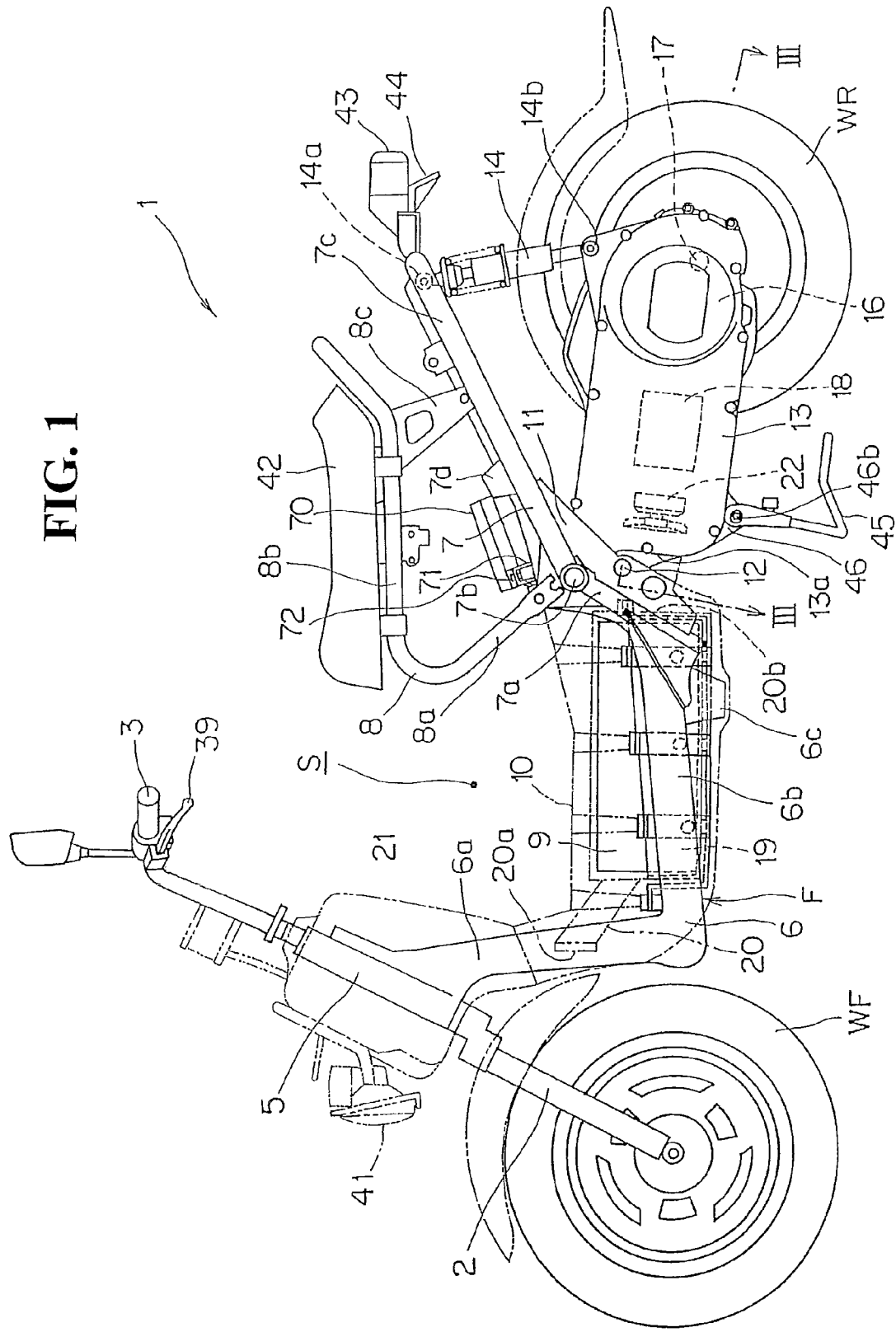
FIG. 1 is a lateral view of an electric motorcycle according to an embodiment of the present invention.

The present invention will now be described with reference to the accompanying drawings, wherein the same reference numerals have been used to identify the same or similar elements throughout the several views. It is to be noted that in the following description, directions such as upside and downside, back and forth, and right and left are based on the perspective of a rider.

Figure 2:
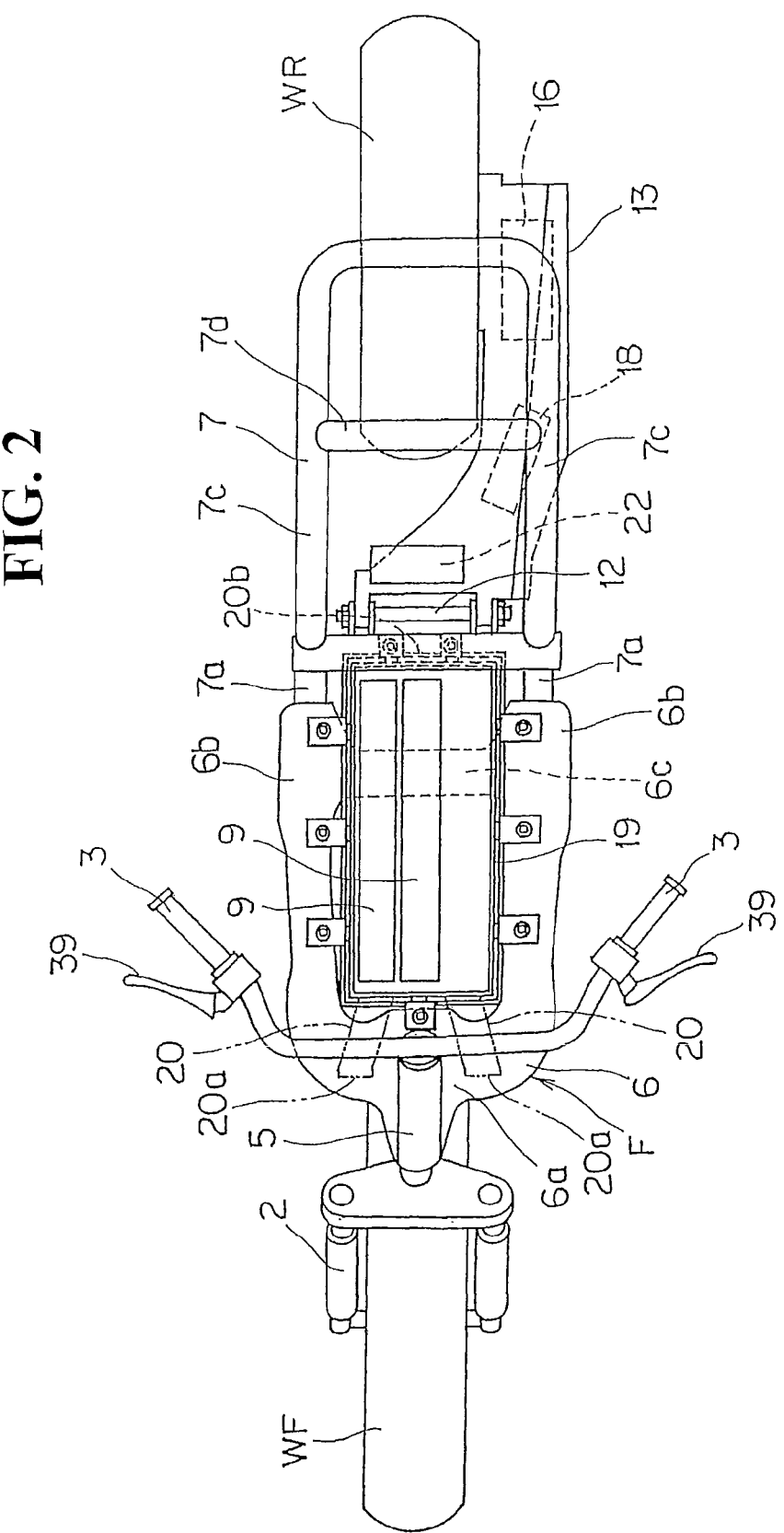
FIG. 2 is a plan view of FIG. 1.

FIG. 1 is a lateral view of a battery-powered electric vehicle according to an embodiment of the present invention. FIG. 2 is a plan view of FIG. 1. Incidentally, for easy explanation, FIG. 2 omits seat rails 8, a fender cover 21 and a step floor 10 described in FIG. 1.

Referring to FIG. 1, a body frame F of the electric motorcycle 1 includes at a front end a front fork 2 rotatably supporting a front wheel WF and a head pipe 5 steerably supporting a steering handlebar 3 connected to the front fork 2. In addition, the body frame F includes a center frame 6, a rear frame 7 and a seat rail 8. Incidentally, the frames 6, 7, 8 are each formed as a pair symmetrical with each other in a vehicle body-width direction as illustrated in FIG. 2.

The center frame 6 is composed of an inclined portion 6a provided continuously with the above-mentioned head pipe 5 so as to extend rearward and obliquely downwardly in the vehicle body and a horizontal portion 6b bending at a lower end of the inclined portion 6a and generally horizontally extending toward the rearward of the vehicle body. In addition, the center frame 6 is such that the right and left horizontal portions are connected by a cross member 6c in the vehicle-width direction.

The rear frame 7 is composed of a first inclined portion 7a and a second inclined portion 7c. The first inclined portion 7a extends from the rear end of the horizontal portion 6b of the center frame 6 toward the rearward and obliquely upside of the vehicle body. The second inclined portion 7c extends from a bent portion 7b bent at the rear end of the first inclined portion 7a toward the rearward and obliquely upside of the vehicle body at a more moderate slope than the first inclined portion 7a. The second inclined portion 7c is such that right and left portions thereof are connected by a cross frame 7d extending in the vehicle body-width direction as shown in FIG. 2.

The seat rail 8 is attached to the upside of the rear frame 7 so as to form a generally inverse-U shape. In addition, the seat rail 8 is composed of an inclined portion 8a, a horizontal portion 8b and a support portion 8c. The inclined portion 8a extends from the bent portion 7b of the rear frame 7 toward the front and oblique upside of the vehicle body. The horizontal portion 8b extends horizontally rearward from the upper end of the inclined portion 8a. The support portion 8c extends rearward and obliquely downwardly from the rear portion of the horizontal portion 8b toward the second inclined portion 7c of the rear frame 7.

As illustrated in FIGS. 1 and 2, batteries 9, detailed later, are housed in a battery box 19 on the horizontal portion 6b of the center frame 6. The battery box 19 is mounted in such a manner as to be clamped between the pair of right and left frames of the horizontal portion 6b. The bottom face of the battery box 19 is located below the horizontal portion 6b as viewed in side elevation in FIG. 1. The cross member 6c of the center frame 6 is formed such that a central portion thereof, in the vehicle body-width direction, sags downward. The battery box 19 is fixedly mounted on the cross member 6c.

A portion on which the battery box 19 is disposed corresponds to a portion below the so-called foot rest space S. The battery box 19 is covered from above by a step floor 10 adapted to receive rider's feet thereon.

The battery box 19 is formed like a generally rectangular parallelepiped box housing the batteries 9 therein. The batteries 9 are arranged in a row inside the battery box 19. Air introduction ducts 20 are provided on either side of the front surface of the battery box 19 so as to take outside air into the inside of the box. On the other hand, a discharge port 20b is formed in the rear surface of the battery box 19 so as to discharge the air outside.

In this way, outside air taken into from introduction ports 20a (the air introduction ducts 20) can cool the batteries 9 and the outside air that has cooled the batteries 9 can be discharged from the discharge port 20b.

As illustrated in FIG. 1, pivot plates 11 projecting toward the rear of the vehicle body are provided on the respective right and left portions of the rear frame 7 at a position close to a connecting portion to the center frame 6 and below the bent portion 7b. A pivot shaft 12 is provided spanning between and passing through the right and left pivot plates 11 in the vehicle-width direction. The swing arm 13 is connected at its front end to the pivot shaft 12 so as to swing up and down around the pivot shaft 12.

The swing arm 13 is connected to the second inclined portion 7c of the rear frame 7 by means of a rear suspension 14 located on the left side of the vehicle body-width direction. More specifically, an upper end 14a of the rear suspension 14 is attached to the second inclined portion 7c of the rear frame 7 and a lower end 14b of the rear suspension 14 is attached to the rear portion of the swing arm 13. In this way, the rear suspension 14 absorbs the vertical vibration of the rear wheel WR supported by the rear end portion of the swing arm 13.

A pair of swing support portions 13b are provided at the front leading end portion of the swing arm 13 so as to be swingably attached to the pivot shaft 12 in such a manner as to be spaced from each other in the right-left of the vehicle body-width direction. In the state of being attached to the pivot shaft 12, the swing arm 13 obliquely extends from the pivot shaft 12 (the swing support portions 13b) toward the rear and obliquely left side of the vehicle body, avoiding the rear wheel WR, and terminates at the rear of the vehicle body along the left side of the rear wheel WR. The swing arm 13 is provided at a rear portion thereof with a rear axle 17 extending in the vehicle-width direction. The rear wheel WR is rotatably cantilever supported by the rear axle 17.

Incidentally, in FIGS. 1 and 2, reference numeral 41 identifies a headlight for illuminating the front of the vehicle body, 42 identifies an occupant seat horizontally mounted to the horizontal portion 8b of the seat rail 8, 43 identifies a brake lamp attached to the rear end portion of the rear frame 7, and 44 identifies a reflector located below the brake lamp 43.

Figure 3:
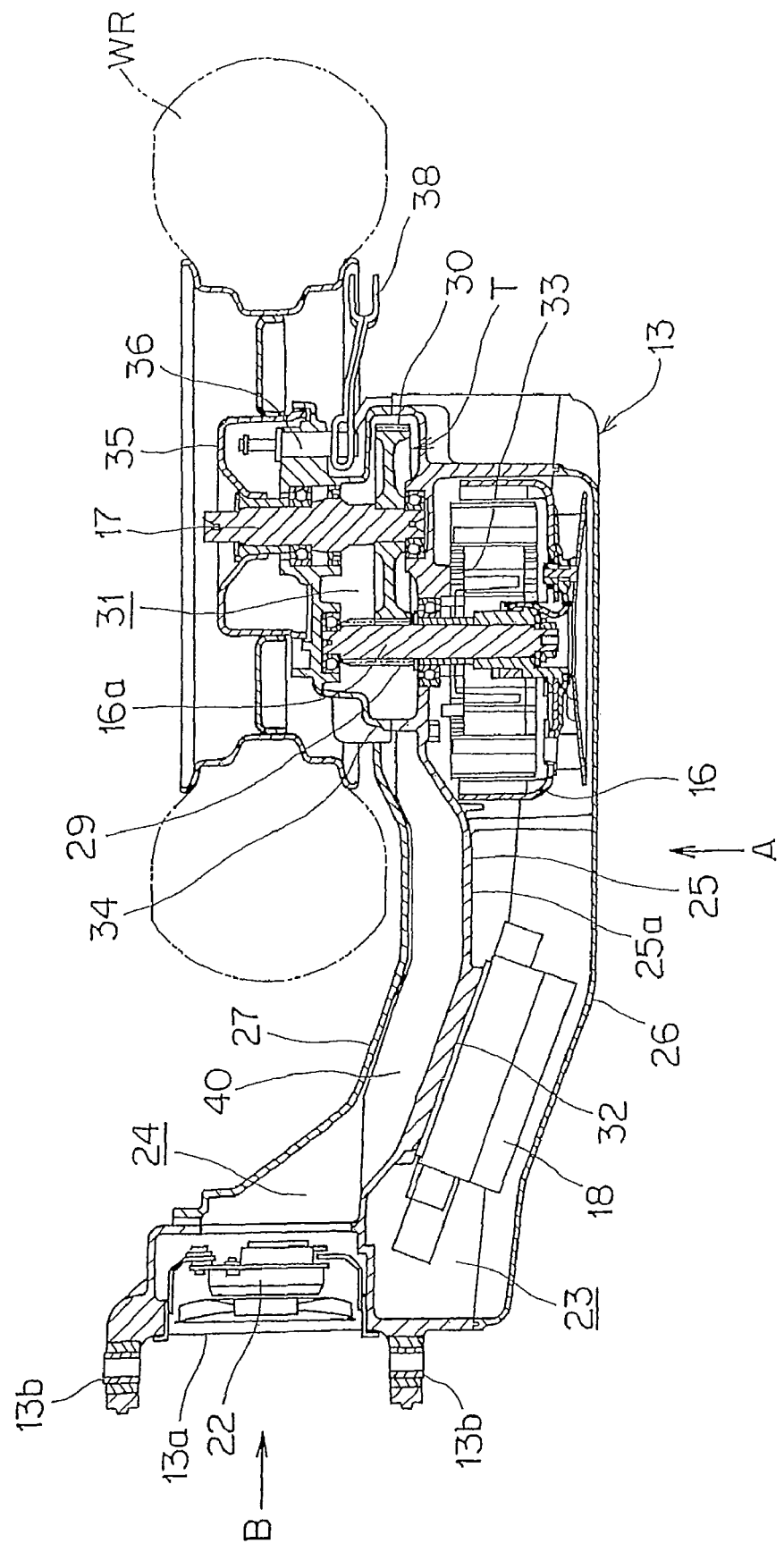
FIG. 3 is a cross-sectional view illustrating a swing arm alone, taken along line III-III of FIG. 1.
Figure 4:
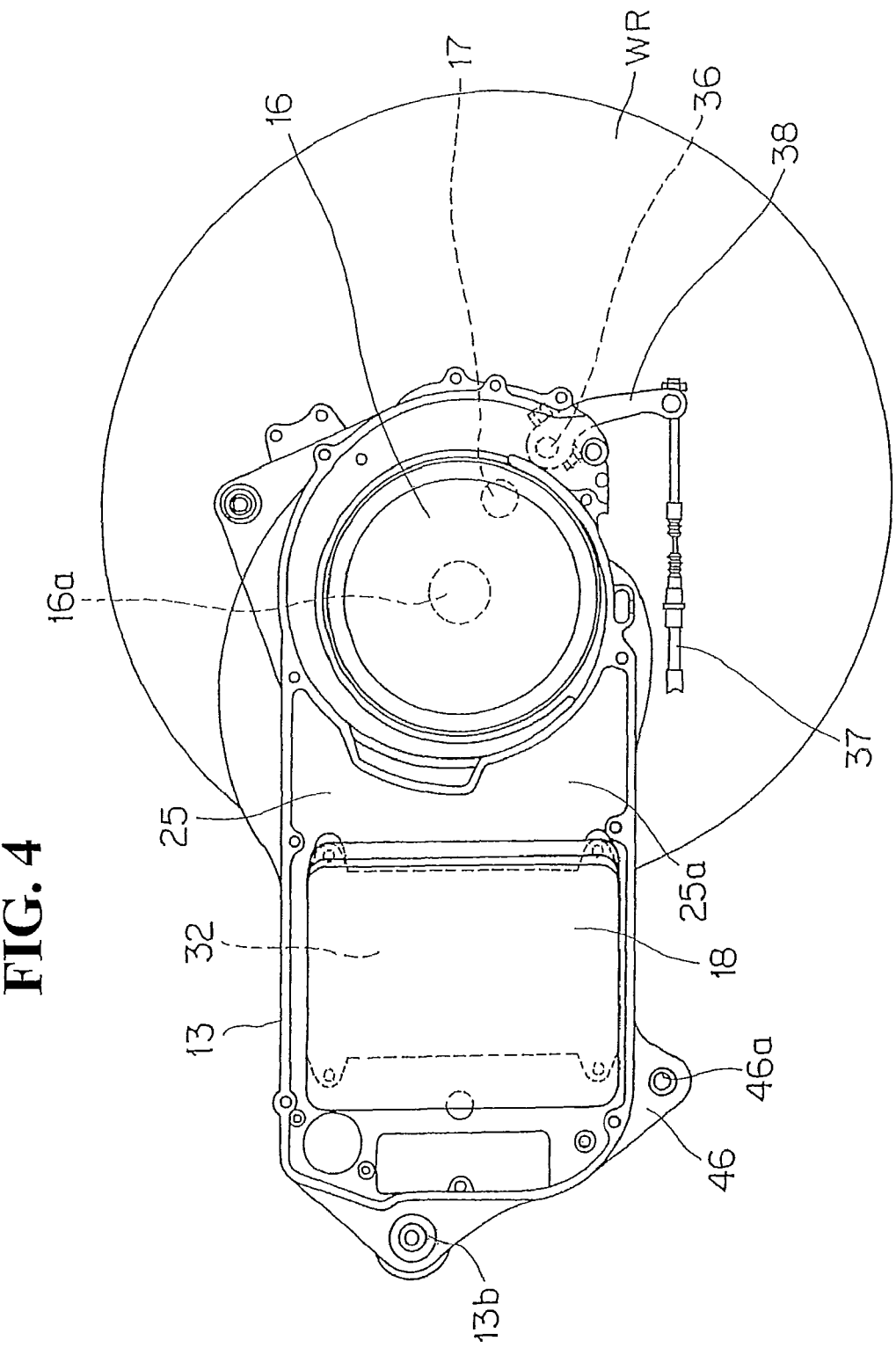
FIG. 4 is a left lateral view of FIG. 3.
Figure 5:
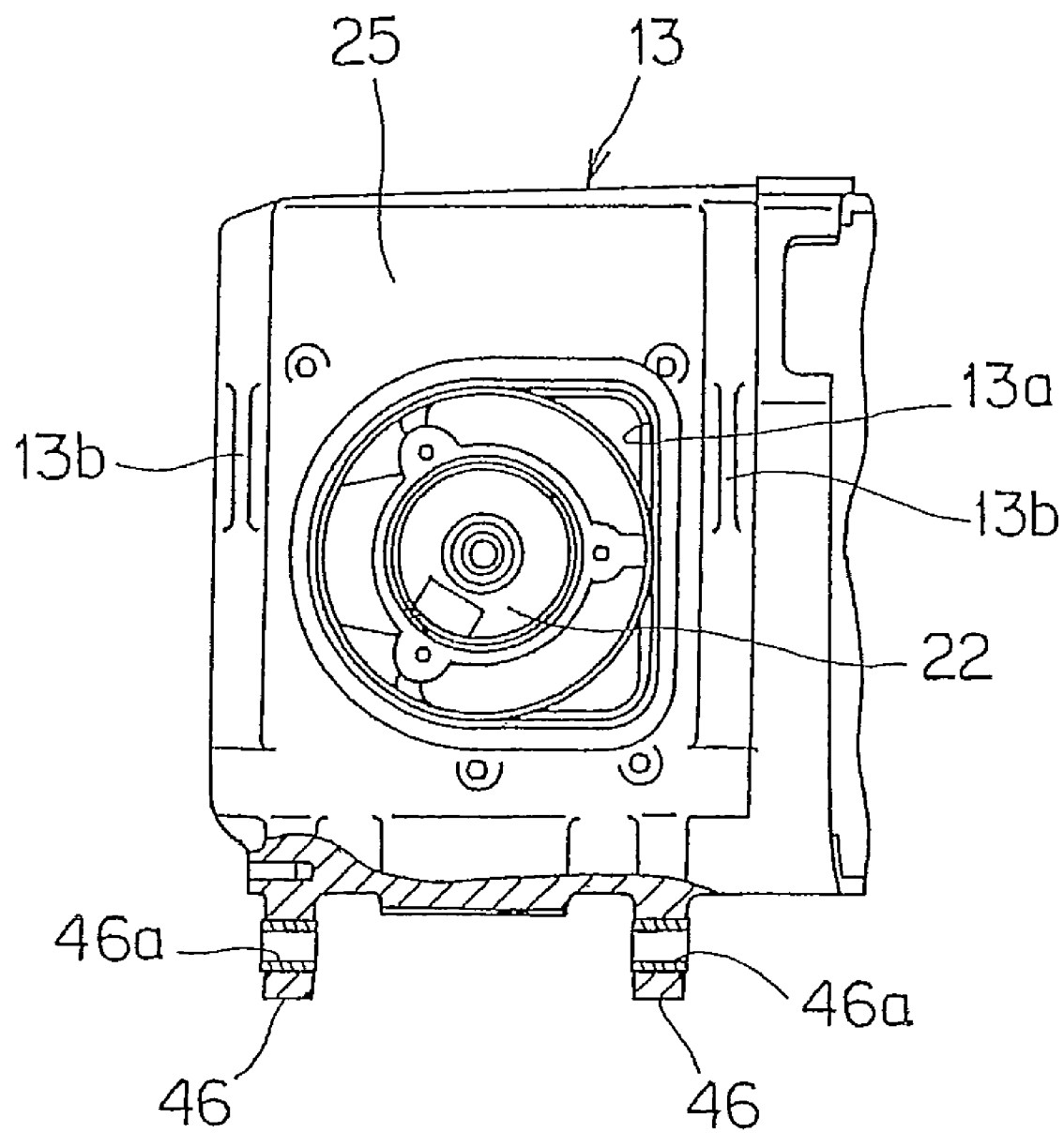
FIG. 5 is a view as viewed from the front side of a vehicle body in FIG. 3.

FIG. 3 is a sectional plan view illustrating the swing arm 13 alone, taken along line III-III of FIG. 1. FIG. 4 is a left lateral view of FIG. 3 (a view as viewed from an A-direction of FIG. 3), with a left cover (an outer cover) 26 depicted in FIG. 3 removed. FIG. 5 is a view as viewed from the front side of the vehicle body (B-direction in FIG. 3).

Referring to FIG. 3, the swing arm 13 is configured by assembling a main body portion 25 having a partition wall 25a extending in the back and forth direction of the vehicle body, a left cover 26 covering the left lateral surface of the main body portion 25, and a right cover 27 covering the right lateral surface of the main body portion 25.

The swing arm 13 is internally formed with two spaces: a device installation space 23 located on the left side of the vehicle body (on the outside of the vehicle body) and an air introduction space 24 located on the right side of the vehicle body (on the inside of the vehicle body). The spaces 23, 24 are defined on the right and left in the vehicle body-width direction by the above-mentioned partition wall 25a and extend in the back and forth direction of the vehicle body.

The left lateral surface of the device installation space 23 is closed by removably attaching the above-mentioned left cover 26 thereto with bolts or the like. The right lateral surface of the air introduction space 24 is closed by removably attaching the above-mentioned right cover 27 thereto, similarly, with bolts or the like.

A power-generating motor 16 for driving the rear wheel WR and a PDU 18 (Power Drive Unit) for controlling the power-generating motor 16 are housed in the device installation space 23. The power-generating motor 16 and the PDU 18 can be maintained by removing the left cover 26.

As illustrated in FIG. 3, the power-generating motor 16 is disposed at the rear portion of the swing arm 13 so as to be removably mounted to a power-generating motor-mounting portion 33 formed on the partition wall 25a. A drive shaft 16a of the power-generating motor 16 is disposed generally parallel to the rear axle 17 of the rear wheel WR. In addition, the drive shaft 16a passes through the partition wall 25a so as to project from the device installation space 23 into the air introduction space 24. A drive gear 29 is carried on the drive shaft 16a and meshes with a reduction gear 30 carried on the rear axle 17. The drive gear 29 has a diameter smaller than that of the reduction gear 30 and transmits the drive force of the power-generating motor 16 to the rear axle 17 in such a manner as to reduce a reduction ratio by one stage.

A gear cover 34 is attached to the main body portion 25 to cover a power transmission portion such as the drive gear 29, the reduction gear 30, etc. The gear cover 34 defines the air introduction space 24 and a drive force transmitting space 31 in which the above-mentioned power transmission portion is disposed. The drive force transmitting space 31 is internally sealed up to keep lubricating oil therein.

A pin member 36 is provided on the gear cover 34 so as to operate a drum brake unit 35. The drum brake unit 35 is operated by operating a brake handle 39 attached to a left steering handlebar 3. Specifically, the brake handle 39 is operated to turn a brake lever 38 via a brake wire 37 illustrated in FIG. 4 so that the pin member 36 attached to the brake lever 38 is operated to operate a brake for the rear wheel WR.

As illustrated in FIGS. 2 and 3, the PDU 18 is disposed forward of the power-generating motor 16 and removably attached, with bolts or the like, to a PDU attachment surface 32 formed on the partition wall 25a. The PDU 18 houses therein a drive circuit, a capacitor, a heat sink, etc., not illustrated.

The PDU 18 is connected to the battery 9 via not illustrated wiring so that electric power is supplied from the battery 9 to the PDU 18. In addition, the PDU 18 is connected via wiring to an ECU (Electric Control Unit), not illustrated, in which a control program and the like are stored so that a control signal is routed from the ECU to the PDU 18. Further, the PDU 18 is connected to the power-generating motor 16 via not illustrated wiring so that electric power and a control signal are routed to the power-generating motor 16 from the PDU 18. Incidentally, the above-described ECU is attached to the vehicle body.

The drive circuit and the like of the PDU 18 produce more heat than other parts. Therefore, the PDU 18 is closely-attached to the PDU attachment surface 32 of the partition wall 25a through an area as wide as possible so as to transmit heat produced from the drive circuit and the like to the partition wall 25a for heat dissipation.

On the other hand, a plurality of fins 40 project from the partition wall 25a in the air introduction space 24. Heat transmitted from the PDU 18 to the partition wall 25a is further transmitted to the fins 40.

The air introduction space 24 is formed with a front opening portion 13a at its front end portion. A cooling fan 22 is installed in the front opening portion 13a so as to supply air into the air introduction space 24. The cooling fan 22 is disposed between the above-described battery box 19 and PDU 18 as viewed in lateral elevation in FIG. 1 and has a function of sucking air inside the battery box 19 from the discharge port 20b. The discharge port 20b of the battery box 19 and the front opening portion 13a of the swing arm 13 conform to each other in the vehicle body-width and -height directions and their openings are arranged to face each other. Consequently, air discharged from the discharge port 20b is efficiently taken into the front opening portion 13a by the cooling fan 22.

A portion of the partition wall 25a to which the power-generating motor 16 is attached is formed with an air hole through which the air introduction space 24 communicates with the device installation space 23. The air taken in from the front opening portion 13a passes through the air introduction space 24, flowing from the above-mentioned air hole into the power-generating motor 16 to cool the inside thereof, and flows out to the atmosphere.

Incidentally, the power-generating motor 16, the PDU 18 and the cooling fan 22 swing up and down together with the rear wheel WR in conjunction with the swing of the swing arm 13.

Referring to FIG. 5, a pair of attachment portions 46 are formed on the lower side of the swing arm 13 in such a manner as to be spaced from side to side in the vehicle body-width direction. Thus, a main stand 45 is attached to the swing arm 13 by means of an attachment pin 46b (see FIG. 1) passed through attachment holes 46a of the attachment portions 46 so that it swings together with the swing arm 13.

Figure 6:
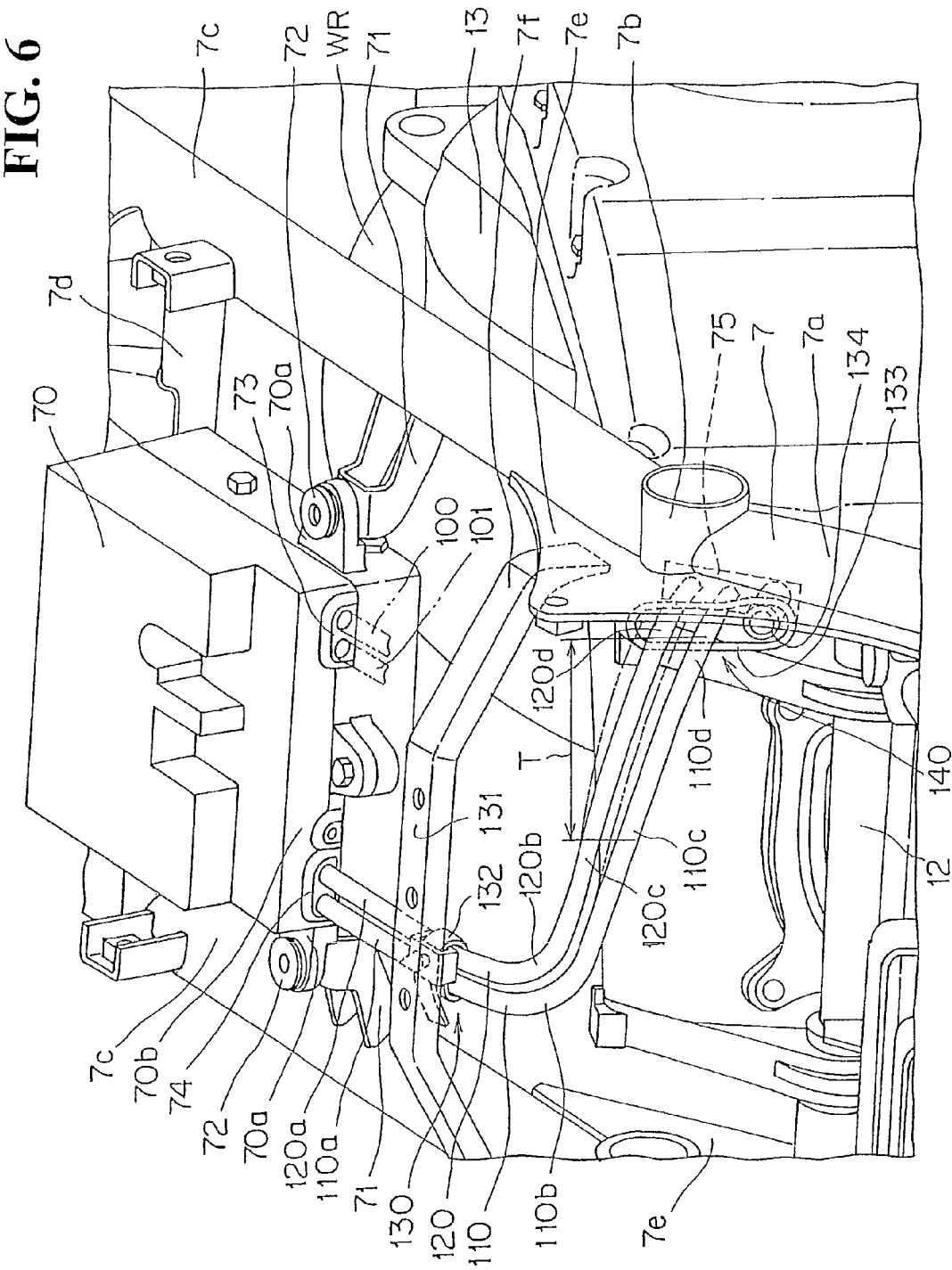
FIG. 6 is a perspective view illustrating an output wiring route from a contactor box to a PDU.

FIG. 6 is a perspective view illustrating an output wiring route from a contactor box 70 to the PDU 18, as viewed from the front and oblique upside of the vehicle body. FIG. 7 is a schematic diagram illustrating the relationship between the displacement of the swing arm 13 and the torsion of the output lines 110, 120.

The contactor box 70 performs switching of the electricity from the batteries 9 and is formed in a generally rectangular parallelepiped shape as illustrated in FIG. 6. As illustrated in FIGS. 1 and 6, the contactor box 70 is disposed forward of and above second inclined portions 7c of the rear frame 7 extending in the back and forth direction of the vehicle body and between the pair of right and left second inclined portions 7c.

Respective support members 71 are attached to the pair of right and left second inclined portions 7c by welding or the like so as to extend toward the inside of the vehicle body. Attachment portions 70a are attached to the respective support members 71 via respective damping grommets 72 so as to project from the right and left front portions of the contactor box 70 toward the outside of the vehicle body. The rear portion of the contactor box 70 is removably attached to a cross frame 7d connecting the right and left second inclined portions 7c via a cushion member not illustrated. With this configuration, the contactor box 70 is removably attached to the rear frame 7.

The batteries 9 and the contactor box 70 are connected by two input lines 100, 101. The contactor box side ends of the input lines 100, 101 are connected to a left wiring connecting portion 73 provided on the vehicle body left side (the right side on the sheet of FIG. 6) of the front surface 70b of the contactor box 70. The left wiring connecting portion 73 is located on the left side relative to the center of the vehicle body-width direction.

The contactor box 70 and the PDU 18 are connected by two output lines 110, 120. The contactor box side ends of the output lines 110, 120 are connected to a right wiring connecting portion 74 provided on the vehicle body right side (the left side on the sheet of FIG. 6) of the front surface 70b of the contactor box 70. The right wiring connecting portion 74 is located on the right side relative to the center of the vehicle body-width direction.

Incidentally, the input lines 100, 101 and the output lines 110, 120 are power lines used to apply direct voltage. One of each of the input and output lines are positive lines and the other of each of the input lines and output lines are negative lines. These lines use common electric wires covered with insulation vinyl and can tolerate torsion around a longitudinally extending axis by elasticity.

A relay connector 75 is provided at a left portion, of the swing arm 13, close to the pivot shaft 12 in such a manner as to be exposed to the outside of the swing arm 13. The PDU side ends of the output lines 110, 120 are connected to the relay connector 75. The output lines 110, 120 are connected from the relay connector 75 to the PDU 18 via internal lines, not illustrated, inside the swing arm 13. In this way, electricity from the batteries 9 is supplied to the PDU 18 via the contactor box 70.

As illustrated in FIG. 6, the output lines 110, 120 extend from the right wiring connecting portion 74 toward the front of the vehicle body (hereinafter called the straight portions 110a, 120a). They bend from the left side of the vehicle body toward the right side (hereinafter called the first bending portions 110b, 120b). They extend from the left side of the vehicle body to the upside of the relay connector 75 on the right side of the vehicle body, generally parallel to the pivot shaft 12 (hereinafter called the torsional portions 110c, 120c). They bend downward at a position above the relay connector 75 (hereinafter called the second bending portions 110d, 120d). Lastly, they connect with the relay connector 75.

These output lines 110, 120 are wired so that the two lines take the same route. They are bundled and fixed at two positions of the wiring route (hereinafter called the first fixing portion 130 and the second fixing portion 140).

As illustrated in FIGS. 1 and 6, gusset plates 7e are each fixedly provided on a corresponding one of insides of right and left bending portions 7b of the rear frame 7 by welding or the like in such a manner as to project above the vehicle body. A cross member 7f is welded to the upper sides of the right and left gusset plates 7e in such a manner as to connect the gusset plates 7e in the vehicle body-width direction. As illustrated in FIG. 6, the cross member 7f is formed in an inverse U-shape and has a generally horizontal support portion 131 formed at its central portion. A line fixing member 132 is attached to the support portion 131.

In the first fixing portion 130 mentioned above, the straight portions 110a, 120a of the output lines 110, 120 are fixed by the line fixing member 132 at their generally central portions in the back and forth direction thereof.

A signal line 134 is connected to the relay connector 75 in order to send a control signal to the PDU 18 from an ECU not illustrated. This signal line 134 and the output lines 110, 120 mentioned above are connected to the relay connector 75 via grommets to prevent rainwater, etc. from entering the inside the swing arm 13.

Further, a line support member 133 is attached to the swing arm 13 by means of bolts or the like. This line support member 133 supports the proximal end portion of the signal line 134 close to the swing arm 13 and a portion (the above-mentioned second fixing portion 140) of the signal line 134 below the second bending portions 110d, 120d of the output lines 110, 120.

The line support member 133 is formed in a generally oval shape and adapted to support the lines passed through the inside thereof. In addition, the line support member 133 permits the output lines 110, 120 and the signal line 134 to shift in the back and forth, and up and down directions (the major axis direction of the oval figure) of the vehicle body but restrains them from shifting in the width-direction of the vehicle body (in the minor axis direction of the oval figure).

A description is next given of the positions of the output lines 110, 120 resulting from the vertical movement of the swing arm 13.

In the state where the rear suspension 14 extends so that the swing arm 13 lies on the lowest point (the unloaded condition), the output lines 110, 120 take wiring routes indicated with solid lines in FIGS. 6 and 7. In this case, the torsional portions 110c, 120c lie in the previously mentioned torsional state.

On the other hand, in the state where the rear suspension 14 contracts so that the swing arm 13 reaches the highest point (the loaded condition), the output lines 110, 120 take wiring routes indicated with two-dot chain lines in FIGS. 6 and 7. In this case, as the torsional portions 110c, 120c vary so as to release their torsion (the torsion loosens or is released), the output lines 110, 120 shift toward the rearward of the vehicle body internally of the oval figure of the line support member 133.

The above-mentioned non-loaded state means a vehicle-stopped state (no rider mounting state). The loaded state means a state where during travelling a vehicle body sags downward so that the swing arm 13 swings upward of the vehicle body.

In this case, since the torsional portions 110c, 120c of the output lines 110, 120 extend generally parallel to the pivot shaft 12, they twist at a portion corresponding to a torsional range T of FIG. 6 to absorb the turning of the swing arm 13. For a portion of the output lines 110, 120 closer to the first bending portions 110b, 120b than the torsional range T, since a portion from the first fixing portion 130 to the first bending portions 110b, 120b is not fixed, the first bending portions 110b, 120b slightly shift to absorb such torsion.

In short, such a line fixing structure makes it difficult for the output lines 110, 120 to deviate from the wiring route due to the swinging motion of the swing arm 13.

According to the embodiment of the present invention, in the electric motorcycle in which the PDU 18 and the running-purpose power-generating motor 16 are attached to the swing arm 13 swinging around the pivot shaft 12 and electricity from the batteries 9 is supplied via the contactor box 70 to the PDU 18, from which the electricity is supplied to the power-generating motor 16, the torsional portions 110c, 120c extending generally parallel to the pivot shaft 12 and allowing their torsion to absorb the swinging movement of the swing arm 13 are provided at a portion of the output lines 110, 120 connecting the contactor box 70 with the PDU 18. In this way, the torsion of the lines can absorb the turning of the swing arm 13. Thus, it is hard to apply a pulling force to the output lines 110, 120, which can make it difficult for the output lines 110, 120 to cause a load.

The line support member 133 is provided close to the swing arm 13 so as to permit the output lines 110, 120 to shift in the back and forth direction of the vehicle body but restrain them from shifting in the width-direction of the vehicle body. Therefore, even if a force resulting from the shift of the swing arm 13 is applied to the output lines 110, 120, the output lines 110, 120 shift in the back and forth direction of the vehicle body, which can make it difficult for a pulling force to be applied to the output lines 110, 120. Since the output lines 110, 120 are restrained from shifting in the width direction, the wiring route will not come close to the sliding portion between the pivot shaft 12 and the swing arm 13.

The torsional portions 110c, 120c are designed such that they lie in a torsional state in the non-loaded state of the vehicle but they are brought into a torsion-released state from the torsional state in the loaded state of the vehicle. Therefore, when the vehicle body sags during operation, it is possible for the output lines 110, 120 not to cause a load in the torsional direction. As a result, the output lines 110, 120 will not cause excessive torsion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric motorcycle, comprising:
a power drive unit and a running-purpose power-generating motor are attached to a swing arm that is mounted to turn around a pivot shaft; and
a contactor box that supplies electricity from a battery to the power drive unit, the electricity being supplied from the power drive unit to the power-generating motor,
wherein a torsional portion that extends generally parallel to the pivot shaft is provided at a portion of an output line connecting the contactor box with the power drive unit so as to allow torsion to absorb swinging movement of the swing arm,
wherein a wiring support member is provided close to the swing arm to permit the output line to shift in back and forth, and up and down directions of a vehicle body, but to restrain the output line from shifting in a width direction of the vehicle body.

2. The electric motorcycle according to claim 1, wherein the torsional portion comes into a torsional state when the vehicle is unloaded, but the torsional portion is released from the torsional state when the vehicle is loaded.

3. The electric motorcycle according to claim 1, wherein a pair of output lines electrically connect the contactor box and the power drive unit, each of the output lines includes a straight portion extending from the contactor box in a forward direction, a first bent portion, said torsional portion extending generally in the vehicle width direction and a second bent portion, said second bent portion attaching to a relay connector near the swing arm.

4. The electric motorcycle according to claim 1, wherein the torsional portion comes into a torsional state when the vehicle is unloaded, but the torsional portion is released from the torsional state when the vehicle is loaded.

5. The electric motorcycle according to claim 1, wherein the output line is fixed at two positions of a wiring route between the contactor box and a relay connector near the swing arm by a first fixing portion and a second fixing portion.

6. The electric motorcycle according to claim 3, further comprising a wiring support member adjacent to the relay connector, the output lines extending through the wiring support member.

7. The electric motorcycle according to claim 3, wherein the output lines are bundled and fixed at two positions of a wiring route between the contactor box and the relay connector by a first fixing portion and a second fixing portion.

8. The electric motorcycle according to claim 6, wherein the wiring support member permits the output lines to shift in back and forth, and up and down directions of the vehicle body, but restrains the output lines from shifting in a width direction of the vehicle body.

9. An electric motorcycle, comprising:
a body frame;
a swing arm pivotably mounted to the body frame;
a rear wheel rotatably mounted to the swing arm;
a power drive unit and a power-generating motor mounted inside of the swing arm; and
a battery mounted on the vehicle body; and
a contactor box mounted to the vehicle body, said contactor box supplying electricity from the battery to the power drive unit via an output line,
wherein the output line includes a torsional portion that extends in the vehicle width direction, said output line allowing torsion to absorb swinging movement of the swing arm,
wherein the output line is fixed at two positions of a wiring route between the contactor box and a relay connector near the swing arm by a first fixing portion and a second fixing portion.

10. The electric motorcycle according to claim 9, wherein a wiring support member is provided close to the swing arm to permit the output line to shift in back and forth, and up and down directions of the vehicle body, but to restrain the output line from shifting in a width direction of the vehicle body.

11. The electric motorcycle according to claim 9, wherein the torsional portion comes into a torsional state when the vehicle is unloaded, but the torsional portion is released from the torsional state when the vehicle is loaded.

12. The electric motorcycle according to claim 9, wherein a pair of output lines electrically connect the contactor box and the power drive unit, each of the output lines includes a straight portion extending from the contactor box in the forward a forward direction, a first bent portion, said torsional portion and second bent portion, said second bent portion attaching to a relay connector near the swing arm.

13. The electric motorcycle according to claim 9, wherein the torsional portion comes into a torsional state when the vehicle is unloaded, but the torsional portion is released from the torsional state when the vehicle is loaded.

14. The electric motorcycle according to claim 12, further comprising a wiring support member adjacent to the relay connector, the output lines extending through the wiring support member.

15. The electric motorcycle according to claim 12, wherein the output lines are bundled and fixed at two positions of a wiring route between the contactor box and the relay connector by a first fixing portion and a second fixing portion.

16. The electric motorcycle according to claim 14, wherein the wiring support member permits the output lines to shift in back and forth, and up and down directions of the vehicle body, but restrains the output lines from shifting in a width direction of the vehicle body.

17. An electric motorcycle, comprising:
a power drive unit and a running-purpose power-generating motor are attached to a swing arm that is mounted to turn around a pivot shaft; and
a contactor box that supplies electricity from a battery to the power drive unit, the electricity being supplied from the power drive unit to the power-generating motor,
wherein a torsional portion that extends generally parallel to the pivot shaft is provided at a portion of an output line connecting the contactor box with the power drive unit so as to allow torsion to absorb swinging movement of the swing arm, wherein a pair of output lines electrically connect the contactor box and the power drive unit, each of the output lines includes a straight portion extending from the contactor box in a forward direction, a first bent portion, said torsional portion extending generally in the vehicle width direction and a second bent portion, said second bent portion attaching to a relay connector near the swing arm.

18. The electric motorcycle according to claim 17, wherein a wiring support member is provided close to the swing arm to permit the output line to shift in back and forth, and up and down directions of a vehicle body, but to restrain the output line from shifting in a width direction of the vehicle body.

19. The electric motorcycle according to claim 17, wherein the output line is fixed at two positions of a wiring route between the contactor box and a relay connector near the swing arm by a first fixing portion and a second fixing portion.

20. The electric motorcycle according to claim 17, further comprising a wiring support member adjacent to the relay connector, the output lines extending through the wiring support member.

* * * * *